(12) United States Patent
Su et al.

(10) Patent No.: US 12,386,184 B2
(45) Date of Patent: Aug. 12, 2025

(54) AUGMENTED REALITY GLASSES SYSTEM

(71) Applicant: ADAT Technology Co., Ltd., Taipei (TW)

(72) Inventors: Kai-Hung Su, Tainan (TW); Tsung-Hung Tsai, Tainan (TW)

(73) Assignee: ADAT Technology Co., Ltd., Taipei (TW)

( * ) Notice: Subject to any disclaimer, the term of this patent is extended or adjusted under 35 U.S.C. 154(b) by 0 days.

(21) Appl. No.: 18/442,112

(22) Filed: Feb. 15, 2024

(65) Prior Publication Data

US 2024/0295741 A1 Sep. 5, 2024

(30) Foreign Application Priority Data

Mar. 1, 2023 (TW) ................................ 112201739

(51) Int. Cl.
*G02B 27/01* (2006.01)
*G02B 27/00* (2006.01)

(52) U.S. Cl.
CPC ..... *G02B 27/0176* (2013.01); *G02B 27/0093* (2013.01); *G02B 27/0101* (2013.01); *G02B 2027/0138* (2013.01); *G02B 2027/014* (2013.01)

(58) Field of Classification Search
CPC .............................. G02B 27/01; G02B 27/017
See application file for complete search history.

(56) References Cited

U.S. PATENT DOCUMENTS

| | | | |
|---|---|---|---|
| 11,378,802 B2 | 7/2022 | Moon | |
| 2015/0254905 A1* | 9/2015 | Ramsby | G02B 30/34 |
| | | | 345/419 |
| 2016/0261840 A1* | 9/2016 | Nakashima | H04N 23/88 |
| 2018/0329209 A1 | 11/2018 | Nattukallingal | |
| 2020/0090807 A1* | 3/2020 | Cole | A61N 1/37282 |
| 2020/0315449 A1 | 10/2020 | Kayser et al. | |
| 2021/0192781 A1* | 6/2021 | Ohashi | G06T 7/20 |
| 2022/0231523 A1 | 7/2022 | Bristol et al. | |
| 2022/0357766 A1* | 11/2022 | Karkera | G02B 27/017 |
| 2024/0113656 A1* | 4/2024 | Thiel | H02S 20/30 |

FOREIGN PATENT DOCUMENTS

| | | |
|---|---|---|
| CN | 111260789 A | 6/2020 |
| CN | 112782874 A | 5/2021 |
| CN | 113907475 A | 1/2022 |

* cited by examiner

*Primary Examiner* — Roy P Rabindranath
(74) *Attorney, Agent, or Firm* — CKC & Partners Co., LLC

(57) ABSTRACT

An augmented reality glasses system includes a head-mounted display device and a back-mounted device. The head-mounted display devices include a see-through display and sensors. The back-mounted device has a power module which is electrically connected to the head-mounted display device. The split design is suitable for long-term use in industrial environments.

7 Claims, 4 Drawing Sheets

AUGMENTED REALITY GLASSES SYSTEM

RELATED APPLICATIONS

This application claims priority to Taiwan Application Serial Number 112201739 filed Mar. 1, 2023, which is herein incorporated by reference.

BACKGROUND

Field of Invention

The present disclosure relates to an augmented reality glasses system particularly used in an industrial environment.

Description of Related Art

Most augmented reality glasses currently available in the market are designed for users to experience augmented reality and engage in gaming activities, catering primarily to entertainment purposes. However, when augmented reality technology is applied in industrial environments, existing products fail to meet the specific needs of the industry.

SUMMARY

Embodiments of the present disclosure provide an augmented reality glasses system including a head-mounted display device and a back-mounted device. The head-mounted display device includes a see-through display and at least one sensor which is configured to obtain depth information and image information. The back-mounted device includes a power module electrically connected to the head-mounted display device.

In some embodiments, the at least one sensor includes a time of flight sensor, a plurality of optical sensors and an inertial measurement unit.

In some embodiments, the back-mounted device further includes a computing circuit. The time of flight sensor is configured to obtain an instant point cloud, and the computing circuit is configured to compare the instant point cloud with a default environment point cloud to compute a position of the head-mounted display device in an environment.

In some embodiments, one of the optical sensors is configured to obtain an environment image. The computing circuit is configured to perform an object detection algorithm to recognize at least one object in the environment image.

In some embodiments, one of the optical sensors is configured to obtain an eye image, and the computing circuit is configured to detect a pupil in the eye image.

In some embodiments, two of the optical sensors are disposed upward and at two sides the head-mounted display device for obtaining a left-eye view image and a right-eye view image.

In some embodiments, the power module is a hot pluggable power supply.

In some embodiments, the head-mounted display device further includes a vibration headphone.

In some embodiments, the head-mounted display device further includes a plurality of buttons configured to control a brightness of the see-through display or a volume of the vibration headphone.

In some embodiments, the system further includes a vest for carrying the back-mounted device.

BRIEF DESCRIPTION OF THE DRAWINGS

The disclosure can be more fully understood by reading the following detailed description of the embodiment, with reference made to the accompanying drawings as follows.

DETAILED DESCRIPTION

Specific embodiments of the present invention are further described in detail below with reference to the accompanying drawings, however, the embodiments described are not intended to limit the present invention and it is not intended for the description of operation to limit the order of implementation. Moreover, any device with equivalent functions that is produced from a structure formed by a recombination of elements shall fall within the scope of the present invention. Additionally, the drawings are only illustrative and are not drawn to actual size.

The using of "first", "second", "third", etc. in the specification should be understood for identifying units or data described by the same terminology, but are not referred to particular order or sequence.

Figure 1A:
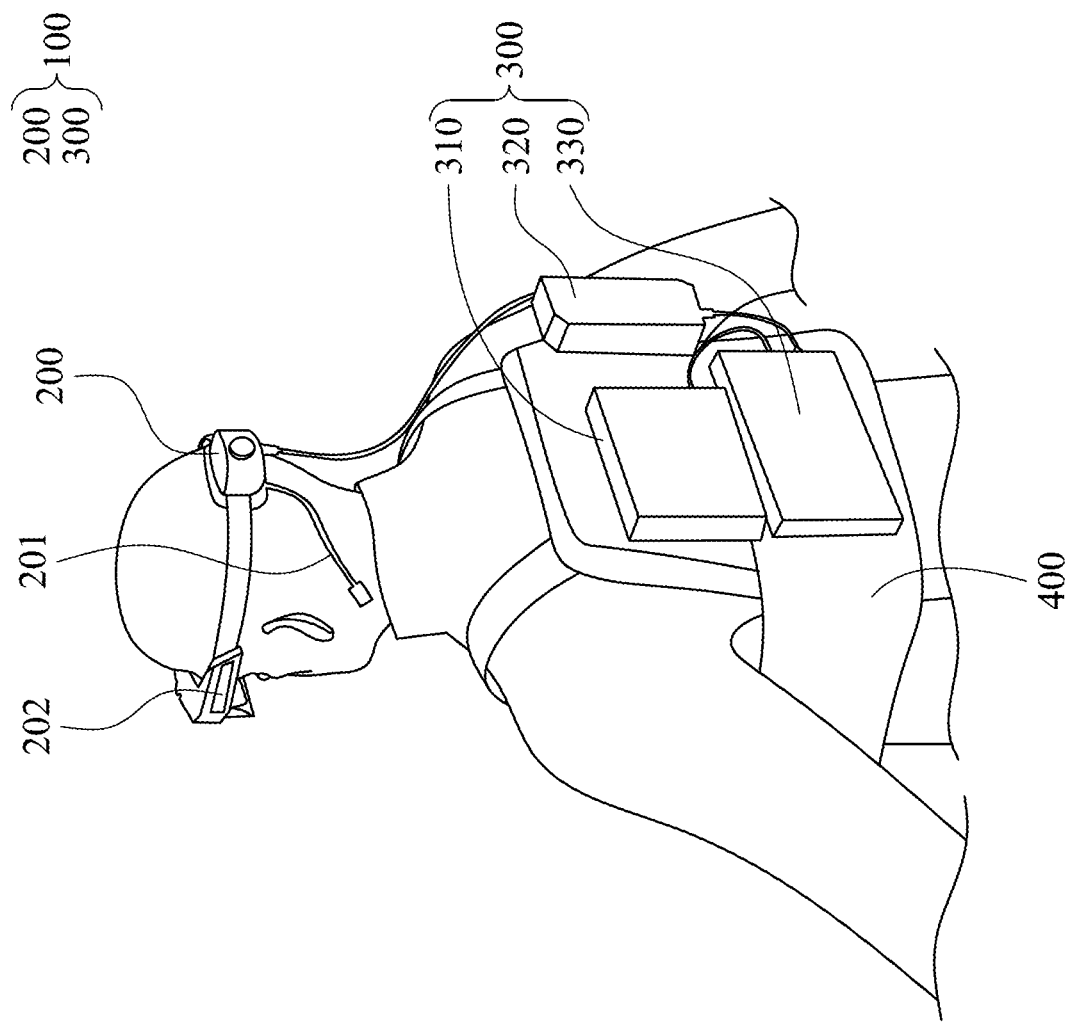
FIGS. 1A and 1B illustrate schematic usage scenarios of an augmented reality glasses system according to an embodiment.
Figure 1B:
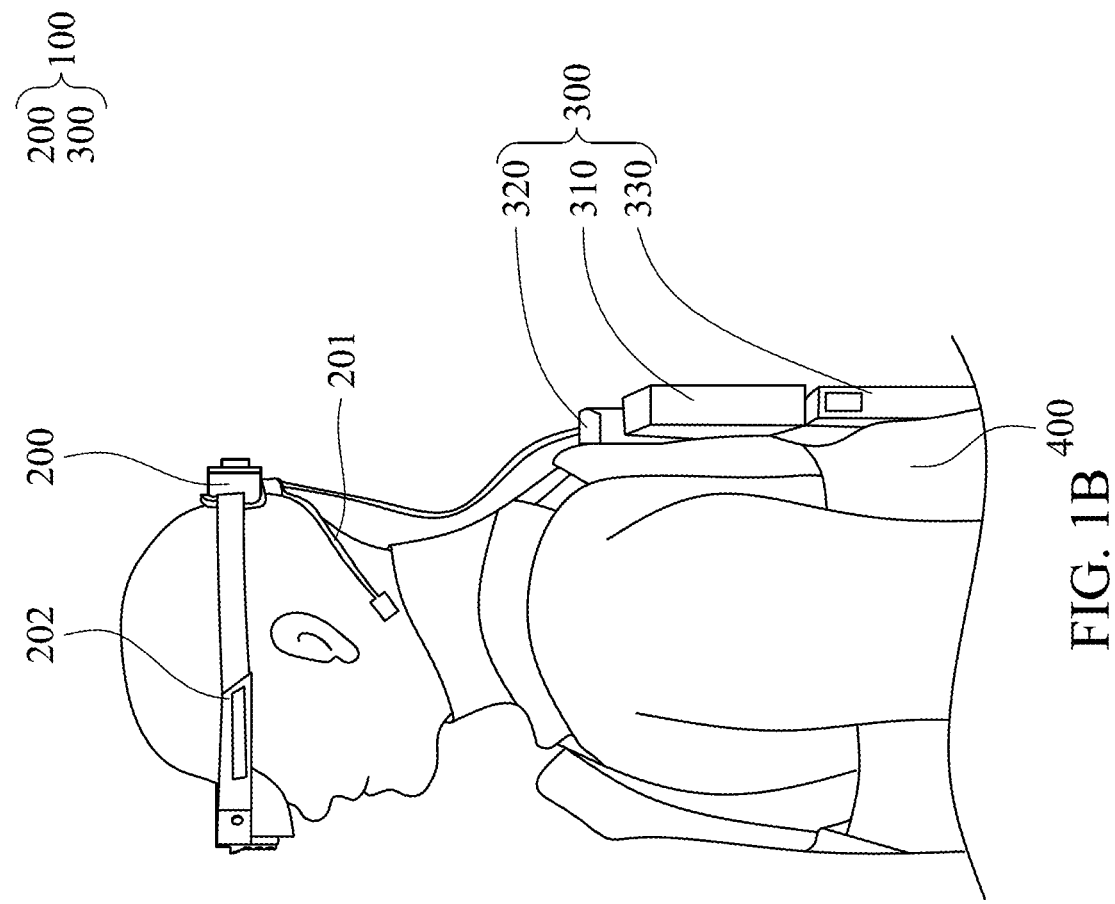

FIGS. 1A and 1B illustrate schematic usage scenarios of an augmented reality glasses system according to an embodiment. Referring to FIGS. 1A and 1B, an augmented reality glasses system 100 includes a head-mounted display device 200 and a back-mounted device 300. The head-mounted display device 200 includes a see-through display and multiple sensors to facilitate augmented reality functionalities, which will be further described in conjunction with the figures.

The back-mounted device 300 includes a computing circuit 310, a control module 320, and a power module 330. The computing circuit 310 may comprise a central processing unit, a graphics processing unit, a microprocessor, a microcontroller, a digital signal processor, an image processing chip, a special-purpose integrated circuit, etc. The control module 320 may include one or more buttons, touch panels, or any device capable of interacting with the user. The power module 330 is electrically connected to the computing circuit 310, control module 320, and head-mounted display device 200 via power lines, providing power to each component. In some embodiments, the computing circuit 310, control module 320, and power module 330 are integrated into a single module. In this embodiment, the user wears a vest 400, which is used to carry the back-mounted device 300, thus the weight of the back-mounted device 300 is supported by the user's body. This separate design approach helps to reduce the weight of the head-mounted display device 200. In other embodiments, the vest 400 can be replaced with straps, belts, or any kind of apparel. In some embodiments, the power module 330 is a hot pluggable power supply, allowing for the battery to be replaced at any time, which is suitable for long-duration industrial use scenarios.

In FIGS. 1A and 1B, the head-mounted display device 200 includes a vibration headphone 201 and a microphone 202. The vibration headphone 201, for example, is a bone conduction headphone. The microphone 202, for example, is a directional microphone. In other embodiments, the microphone 202 can also be a vibration-type microphone, positioned near the user's throat (not shown). The aforementioned design is suitable for scenarios with extremely loud ambient noise (such as factories, airports, etc.), where using vibration-type headphones or directional microphones can eliminate communication problems caused by environmental noise, maintaining smooth communication.

Figure 2A:
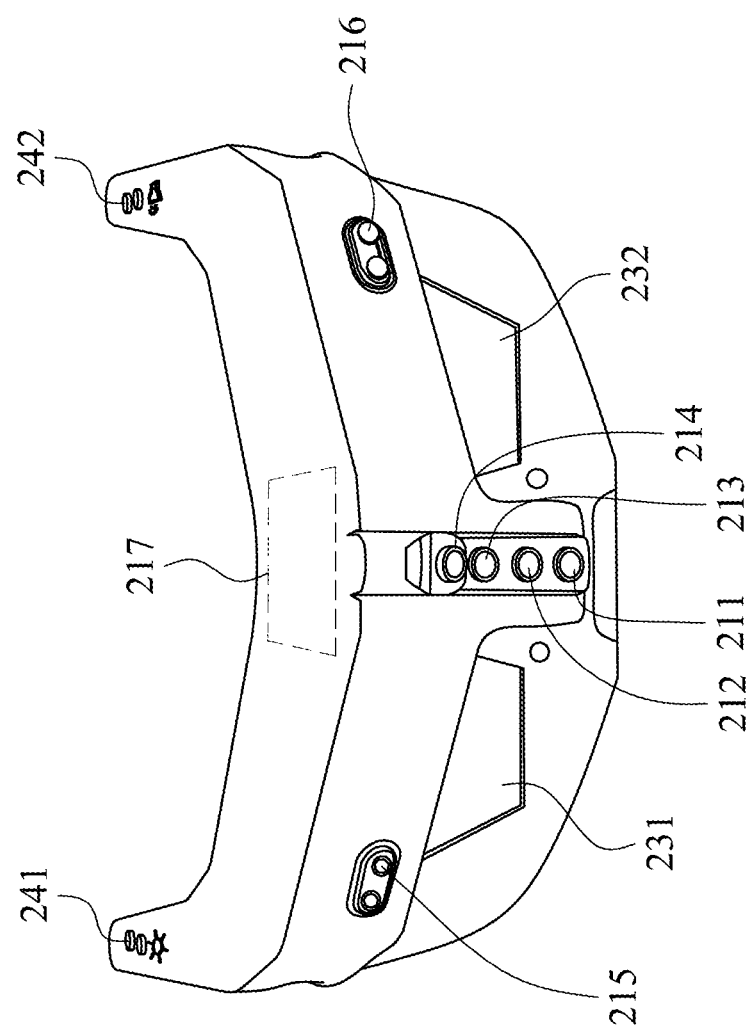
FIG. 2A illustrates a schematic view of the head-mounted display device 200 from the outside, according to an embodiment.
Figure 2B:
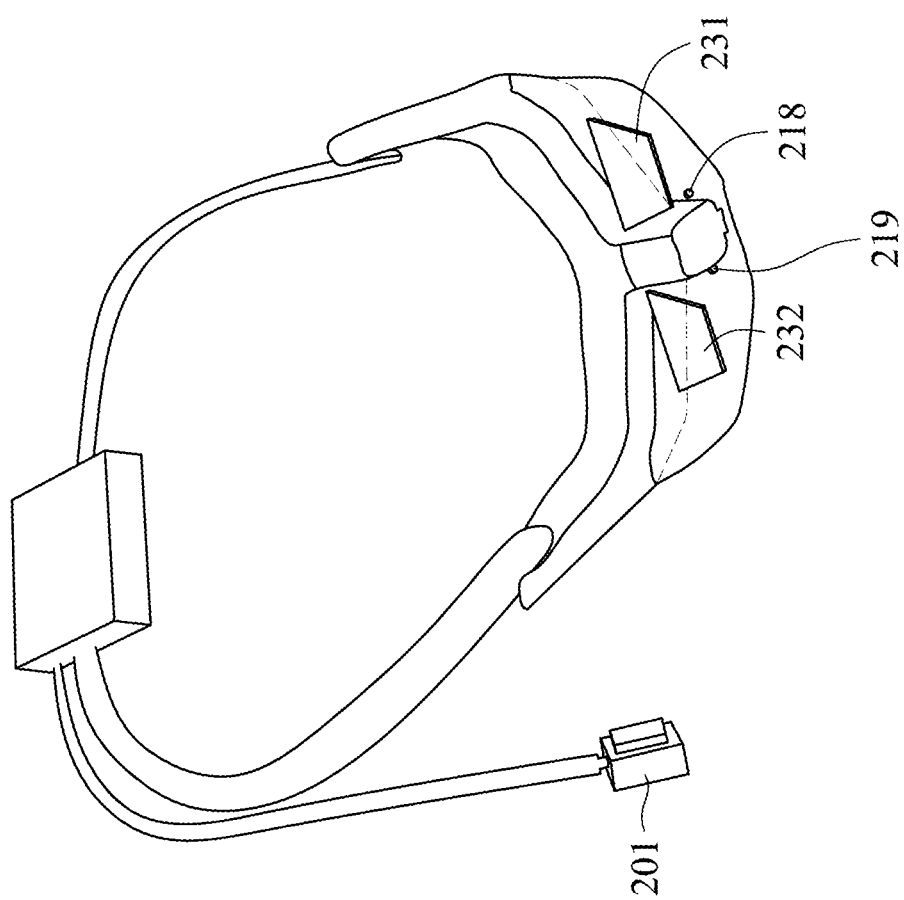
FIG. 2B illustrates a schematic view of the head-mounted display device 200 from the inside, according to an embodiment.

FIG. 2A illustrates a schematic view of the head-mounted display device 200 from the outside, according to an embodiment. FIG. 2B illustrates a schematic view of the head-mounted display device 200 from the inside, according to an embodiment. The head-mounted display device 200 has an inner side facing the user and an outer side facing the surrounding environment. In some embodiments, the center of gravity of the head-mounted display device 200 is designed to align with the human body's center of gravity, reducing the burden on the user. The head-mounted display device 200 includes see-through displays 231, 232, and multiple sensors 211-219. The sensors 211-219 can acquire depth information and image information about the surrounding environment, as well as the device's own positioning information, etc. This information, after being processed, can generate various patterns, texts, numbers, etc., and be displayed on the see-through displays 231, 232. The user can see these pieces of information and the external environment simultaneously, thereby achieving the purpose of augmented reality.

Specifically, the sensors 211, 212, 215, 216, 218, and 219 are optical sensors. Among these, the sensors 211, 212, 215, and 216 are positioned on the outer side of the head-mounted display device 200, while the sensors 218 and 219 are located on the inner side. These optical sensors may include Charge-coupled Device (CCD) sensors, Complementary Metal-Oxide Semiconductor (CMOS) sensors, or other suitable photodetectors. The sensor 211 captures an environment image, which is processed by the computing circuit 310 using various artificial intelligence algorithms, such as an object detection algorithm to recognize objects in the environment image (e.g., specific wiring, devices, etc.). Alternatively, the artificial intelligence algorithms can detect anomalies in the environment image and display related information on the see-through displays 231, 232. The sensor 212 captures continuous video footage, which can be stored in memory (not shown) or a cloud database. In this embodiment, sensors 211 and 212 are two independent sensors, but in other embodiments, they can be combined into a single sensor.

The sensors 215 and 216 are disposed upward and positioned on two lateral sides of the head-mounted display device 200, with the sensor 216 designed to capture a left-eye view image and the sensor 215 to capture a right-eye view image. These left and right-eye view images are used to extract environmental information, based on which certain positioning algorithms can be executed, such as the Simultaneous Localization and Mapping (SLAM) algorithm. The sensors 218 and 219 are placed on the inner side, facing the user's eyes. The sensor 218 captures an eye image of the right eye, while the sensor 219 captures an eye image of the left eye. The computing circuit 310 can detect the position of the pupils in the eye images, thereby determining the user's current gaze target.

The sensor 217 is an inertial measurement unit (IMU), which may include an accelerometer, an angular velocity sensor, a gyroscope, etc. It is used to obtain information about position, orientation, and other related data.

The sensors 213 and 214 are time-of-flight sensors (TOF sensors) configured to acquire depth information. In some embodiments, this depth information forms a point cloud, referred to as an instant point cloud. In industrial environments, where the surrounding equipment and environment are known, 3D models of the relevant equipment and the environment can be obtained in advance. These 3D models are converted into point clouds (termed default environment point cloud). By comparing the instant point cloud with the default environment point cloud, the position of the head-mounted display device 200 in the environment is determined. Some conventional techniques use the SLAM algorithm to calculate the position of the head-mounted display device 200 in the environment, which offers lower positioning accuracy. In contrast, using point clouds for positioning provides more precise results. In some embodiments, the aforementioned point cloud comparison algorithm may use the Iterative Closest Point (ICP) algorithm, but this disclosure is not limited to this method. In some embodiments, since point cloud matching consumes significant computational resources, information from the inertial measurement unit and imaging can be used to reduce computation. For example, preliminary information about the user's position and orientation in the environment can be obtained through the inertial measurement unit, or by tracking specific objects in the environment image. After obtaining preliminary position and orientation, it is possible to exclude less relevant (more distant) points from the default environment point cloud, comparing only closer points, thereby reducing computational load. The aforementioned point clouds are used to determine the postures, gestures, etc., of other users, though this disclosure is not limited to these applications. In some embodiments, the sensors 213 and 214 are combined.

The head-mounted display device 200 also includes buttons 241 and 242, positioned on the upper surface of the device. The button 241 is used to control the brightness of the see-through displays 231 and 232, while the button 242 is used to control the volume of the vibration headphone 201. The aforementioned arrangement of sensors and buttons is just an example; this disclosure does not limit the size and shape of the head-mounted display device 200, nor does it restrict the number and placement of sensors and buttons.

In summary, the augmented reality glasses system proposed in this disclosure exhibits the following characteristics. First, it provides improved positioning accuracy, as the use of point cloud matching can achieve the precision required by industrial standards. Second, by integrating augmented reality with artificial intelligence and employing dedicated sensors 211 and 212, the system maximizes AI algorithm performance (preventing resource allocation to other processes). This allows for precise display of recognized anomalies in AI-identified images, enabling users to clearly understand the location of these anomalies and avoid misinterpretations due to display errors. Third, applicability in different settings: Most augmented reality glasses on the market are only suitable for limited, closed environments. In semi-open environments, they often suffer from positioning errors and unclear virtual information display. The aforementioned design improvements in positioning enable this disclosed glasses system to be used in semi-open environments. Fourth, prolonged use: This system features a modular design that significantly reduces the weight of the glasses themselves, aligns the center of gravity of the glasses with the user's vertical centerline, and utilizes ergonomic design to minimize discomfort during wear. The modular design of the power source also enhances system endurance without adding extra weight to the user's head, meeting the industry's need for long-duration use. Fifth, communication fluidity: Industrial environments are typically noisy, including high-tech sectors like the semiconductor industry where cleanrooms are filled with the sound of machinery. The discussed system is redesigned to address this issue, using directional or vibration microphones to effectively eliminate communication problems caused by environmental noise, ensuring smooth communication.

Although the present invention has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. An augmented reality glasses system comprising:
a head-mounted display device comprising a see-through display and at least one sensor which is configured to obtain depth information and image information, wherein the at least one sensor comprises a plurality of optical sensors, wherein two of the optical sensors are positioned on two lateral sides of the head-mounted display device for obtaining a left-eye view image and a right-eye view image; and
a back-mounted device comprising a power module electrically connected to the head-mounted display device;
wherein the at least one sensor further comprises a time of flight sensor and an inertial measurement unit, and the back-mounted device further comprises a computing circuit;
wherein the time of flight sensor is configured to obtain the depth information comprising an instant point cloud, and the computing circuit is configured to exclude at least one less relevant point from a default environment point cloud according to a first position and an orientation in an environment of the head-mounted display device obtained by the inertial measurement unit and compare the instant point cloud with the default environment point cloud to compute a second position of the head-mounted display device in the environment.

2. The augmented reality glasses system of claim 1, wherein one of the optical sensors is configured to obtain an environment image, and the computing circuit is configured to perform an object detection algorithm to recognize at least one object in the environment image.

3. The augmented reality glasses system of claim 1, wherein one of the optical sensors is configured to obtain an eye image, and the computing circuit is configured to detect a pupil in the eye image.

4. The augmented reality glasses system of claim 1, wherein the power module is a hot pluggable power supply.

5. The augmented reality glasses system of claim 1, wherein the head-mounted display device further comprises a vibration headphone.

6. The augmented reality glasses system of claim 5, wherein the head-mounted display device further comprises a plurality of buttons configured to control a brightness of the see-through display or a volume of the vibration headphone.

7. The augmented reality glasses system of claim 1, further comprising a vest for carrying the back-mounted device.

* * * * *